Oct. 13, 1959  H. BINCER  2,908,161
PROBE SUPPORTING MEANS FOR ULTRASONIC TESTING
OF CIRCUMFERENTIALLY EXTENDING BUTT WELDS
Filed July 1, 1955  4 Sheets-Sheet 4

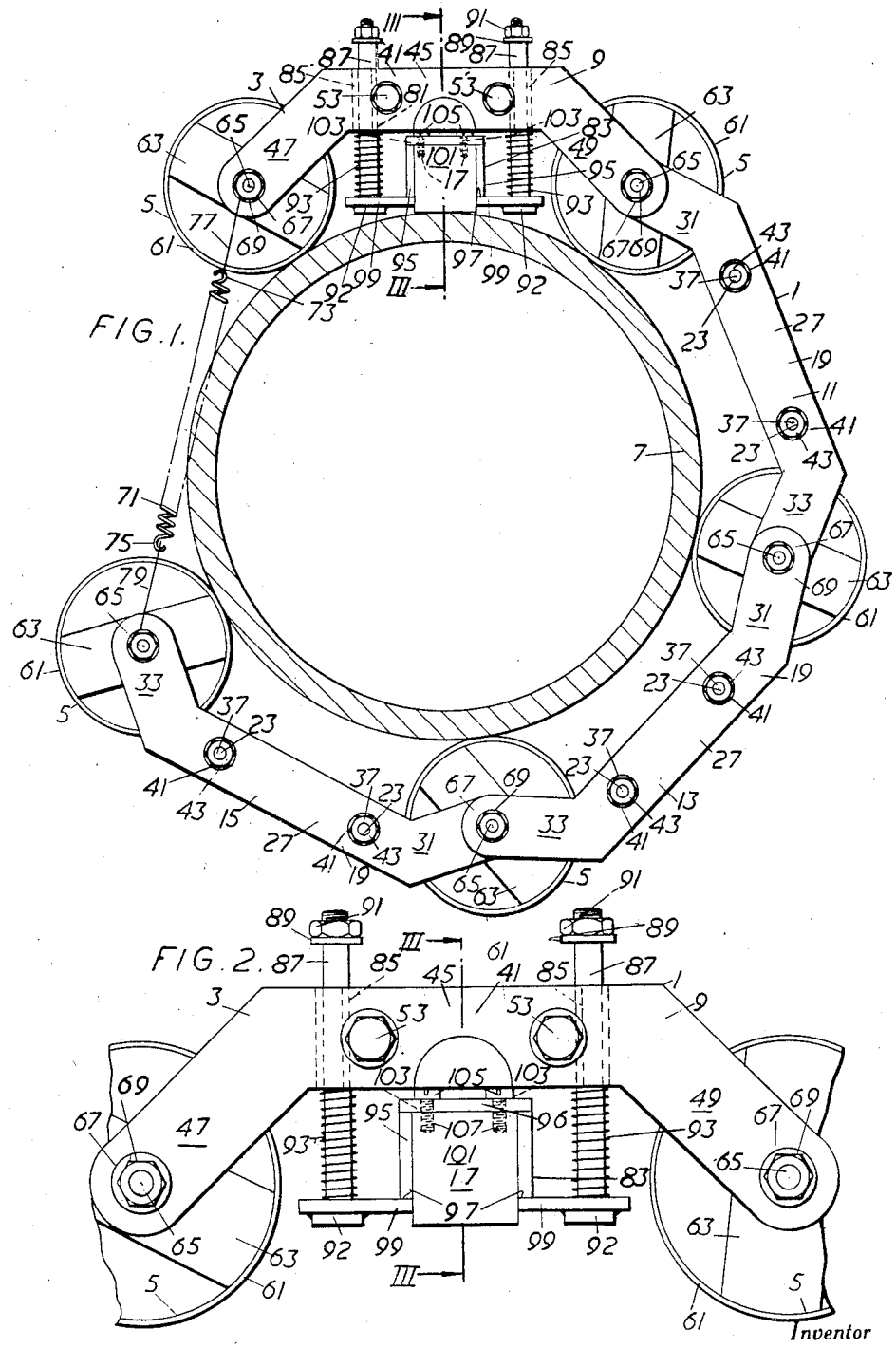

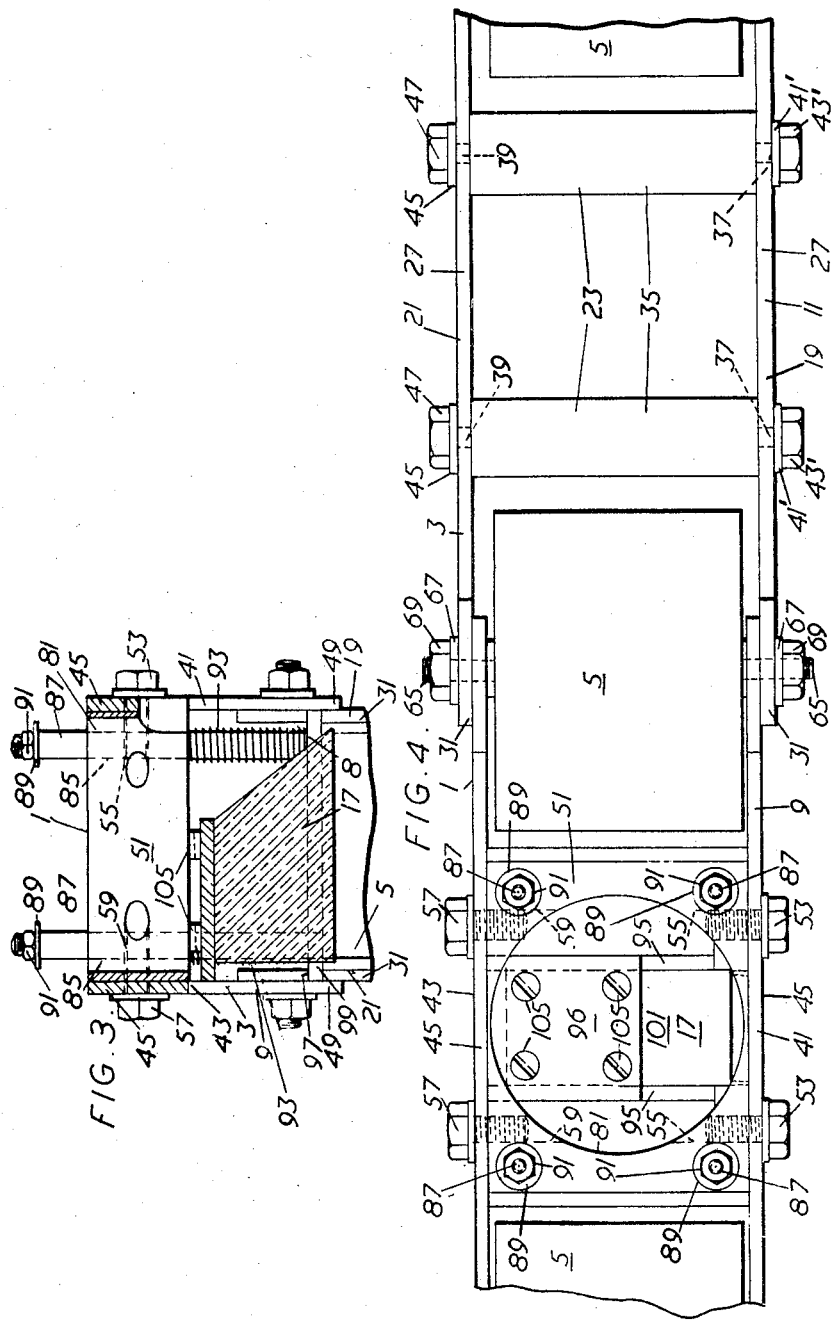

INVENTOR.
Hans Bincer
BY
*J.P. Moran*
ATTORNEY

United States Patent Office 2,908,161
Patented Oct. 13, 1959

2,908,161

PROBE SUPPORTING MEANS FOR ULTRASONIC TESTING OF CIRCUMFERENTIALLY EXTENDING BUTT WELDS

Hans Bincer, London, England, assignor to The Babcock & Wilcox Company, New York, N.Y., a corporation of New Jersey Application July 1, 1955, Serial No. 519,477

Claims priority, application Great Britain July 2, 1954

10 Claims. (Cl. 73—67.8)

This invention relates to probe supporting means for ultrasonic testing of butt welds formed between sections of hollow cylindrical bodies such as pipes and to a method of testing butt welds formed between such sections of which one section may be a nipple, the inlet or outlet portion of a valve or a like part. In the non-destructive testing of a work-piece by ultrasonic examination, supersonic waves, generated by an electro-acoustic transducer are sent through a liquid couplant into the work-piece which is to be tested and, in the event of waves being reflected by a fault constituting a discontinuity, the reflections are received by the same transducer or by a separate transducer and serve to produce an indication on an oscilloscope. Hitherto, in testing butt welds in pipes, the probe comprising a transducer or each probe comprising a transducer has been applied manually. With such operation the continuity and effectiveness of the examination depend upon the skill and application of the operator, the examination takes a considerable time and its reliability may suffer when, as may often happen, access to a part of the pipe circumference is difficult. An object of the invention therefore is to enable the ultrasonic testing of butt welds in pipes to be carried out expeditiously and with improved reliability.

Suitably the weld is examined by moving the probe around a plurality of axially displaced orbits at each side of the weld, the location of any indicated fault is noted and the weld is further examined in the neighborhood of the said location. A further examination may be carried out by manually positioned probes.

Advantageously the position of the probe around the circumference of the pipe is correlated with the cathode raye tube display to give a pictorial representation showing the position of defects in the weld.

Conveniently the probe supporting means is arranged to supply liquid to the surface of the pipe in order to act as a couplant at the interface between the probe and the body.

The invention will now be described, by way of example, with reference to the accompanying, partly diagrammatic drawings, in which:

Figure 1 is a side elevation of probe supporting means mounted on a pipe section for ultrasonic testing of a butt weld formed between that section and an adjacent pipe section and provided with a probe;

Figure 2 is a fragmentary view to a relatively larger scale of a part of Figure 1;

Figure 3 is a sectional side elevation taken on the line III—III of Figure 2;

Figure 4 is a fragmentary plan view to the same scale as that of Figures 2 and 3 of the probe supporting means removed from the pipe section;

Figure 5:
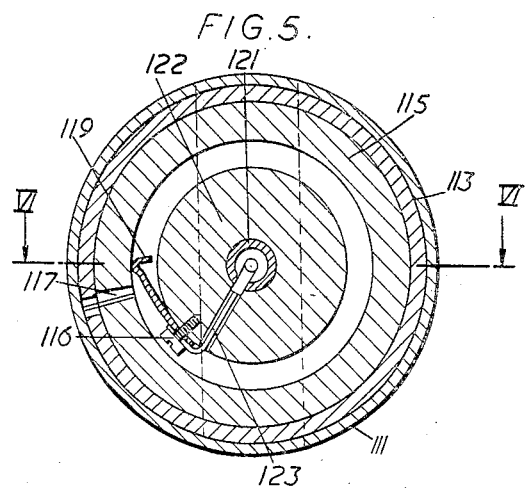
Figure 5 is a sectional elevation of a modified roller for use in the probe supporting means illustrated in Figures 1 to 4.

Referring to Figures 1 to 4, probe supporting means, generally indicated at 1, for ultrasonic testing of butt welds formed between sections of a hollow cylindrical body, include a chain 3 having rollers 5 associated therewith for running on a circumferential track of a pipe section 7 adjacent a weld which is to be tested. Thus, as shown in Figure 1, the probe supporting means 1 are mounted upon the pipe section 7 for ultrasonic testing of a butt weld connecting that section with an adjacent pipe section (not shown). The chain 3 comprises links 9, 11, 13 and 15 of which the link 9 serves, as hereinafter described, as a mounting for a probe element 17, whilst the links 11, 13 and 15 are of similar form each comprising front and rear side pieces 19 and 21 spaced apart by distance pieces 23. The side pieces 19 and 21 each include an intermediate part 27 which, when the probe supporting means are mounted upon the pipe section 7, is radially outwardly offset with respect to a line joining the axes of the associated rollers 5, and end parts 31 and 33 extending respectively from opposite ends of the part 27 inwardly towards the axes of the associated rollers 5. The distance pieces 23 forming part of the links 11, 13 and 15 each include an intermediate section 35 and, at opposite ends thereof, externally threaded end sections 37 and 39 of reduced diameter, the sections 37 extending through apertures formed in the front side pieces 19 and having mounted thereon at the front side of the pieces 19 respective washers 41' and nuts 43' serving to secure the side pieces 19 to the distance pieces 23, whilst the sections 39 are similarly provided with respective washers 45 and nuts 47 mounted at the rear side of the side pieces 21 and serving to secure those side pieces to the distance pieces 23. As seen in Figure 1, the extremities of the link 13 overlap adjacent extremities of the links 11 and 15. To this end the length of the intermediate sections 35 of the distance pieces 23 associated with the link 13 exceeds that of the intermediate sections 35 of the distance pieces 23 forming parts of the links 11 and 15 by an amount equal to the combined thickness of the side pieces 19 and 21.

The link 9 which affords a mounting for the ultrasonic testing, probe element 17 is provided with front and rear side pieces 41 and 43 shaped similarly to the side pieces 19 and 21, each having an intermediate part 45 and end parts 47 and 49. In the mounted position of the probe supporting means, however, the intermediate parts 45 of the respective side pieces 41 and 43 are radially offset, with respect to the line joining the axes of the rollers 5 associated with the link 9, to a somewhat greater extent than are the intermediate parts 27 of the respective links 11, 13 and 15. The side pieces 41 and 43 are so spaced apart that the inner extremities of the end parts 47 and 49 thereof overlap the adjacent extremities of the link 11. A probe supporting plate 51 is disposed between the intermediate parts 45 of the side pieces 41 and 43, and is bolted both to the front side piece 41, by means of bolts 53 which extend through respective apertures in the intermediate part 45 of the side piece 41 and cooperate with respective internally threaded bores 55 formed within the plate 51, and, to the rear side piece 43 by means of bolts 57 which extend through apertures formed in the intermediate part 45 of the side piece 43 and co-operate with internally threaded bores 59 formed in the plate 51. The probe supporting plate 51 extends between the intermediate parts 45 of the side pieces 41 and 43 for a distance greater than the length of the intermediate sections 35 of the distance pieces 23 associated with the link 11 by an amount equal to the combined thickness of the side pieces 19 and 21 to the link 11.

The rollers 5 which are provided at the extremities of the chain 3 and at points along the length of the chain namely at the junctions between the links 9 and 11, 11 and 13 and 13 and 15, each comprise a roller shell 61 provided internally and at opposite ends thereof with respective webs 63, each of which is welded at its outer extremities to the inner surface of the shell 61 and is formed with a central aperture (not shown) through which passes a spindle 65 serving rotatably to support the roller 5. The spindles 65 are each in the form of a bolt which extends axially through and beyond the webs 63 of the associated roller shell 61 and passes through apertures formed in the extremities of the side pieces of the associated chain link or links to which extremities the spindle 65 is clamped by means of washers 67 and nuts 69.

Resilient means, as shown in Figure 1, are provided to draw the ends of the chain 3 towards one another and include a helical tension spring 71 provided at opposite ends thereof with hooks 73 and 75 respectively engaging loops 77 and 79 of wire, the loop 77 being fastened to the spindle 65 of the link 9 by the nut 69, between the washer 67 and the end part 47 of the front side piece 41 of the link 9, whilst the loop 79 is fastened to the spindle 65 of the link 15 by the nut 69 between the washer 67 and the end part 33 of the front side piece 19 of the link 15. The resilient means also include a further helical tension spring (not shown) having hooks at opposite ends thereof which are connected respectively with wire loops attached to the rear ends of the spindles 65 of the respective chain links 9 and 15 at the extremities of the chain 3 in a manner similar to that described with reference to the loops 77 and 79.

The probe supporting plate 51 disposed between the side pieces 41 and 43 of the link 9 is formed with a central circular aperture 81 and acts as a mounting for a carrier 83 which accommodates the probe element 17. As seen in Figures 1 and 2, the mounting of the carrier 83 is such as to permit movement of the carrier radially or substantially radially relative to the pipe section 7. Thus, near each of its four corners, the plate 51 is provided with a bore 85 for the passage of a spring-loaded plunger 87. Each of the plungers 87 is formed at its outer end with an externally threaded section of reduced diameter upon which is mounted a washer 89 and a nut 91, and at its inner end with a part 92 of enlarged diameter which is welded to the carrier 83. Between the carrier 83 and the inner surface of the plate 51 are provided helical springs 93 respectively disposed around the plungers 87 and adapted to urge the carrier 83 inwards relative to the pipe section 7. The diameters of the washers 89 are such as to limit inward movement of the spring-loaded plungers 87 whilst the diameter of each of the bores 85 in the plate 51 is adapted to permit play of the plungers in those bores enabling the probe element 17 to adjust itself to imperfections in the geometry of the circumference of the pipe section 7, equilibrium between the probe element and the outer surface of the pipe section 7 occurring when the contact area between the probe element 17 and the section 7 is a maximum.

The carrier 83 includes a part of inverted, channel-shaped cross-section, the sides 95 of the channel at the forward end thereof sloping forwardly and inwardly from a base portion 96 of the channel to the lower edges 97 of the channel to which are welded flanges 99 of the carrier. The flanges 99 extend laterally and outwardly from the channel and provide means to which the plungers 87 are welded. Within the channel is disposed the probe element 17 which is rectangular in cross-section and is formed of the material known by the registered trademark Perspex. Perspex is a synthetic thermoplastic resin chemically described as polymethyl methacrylate. The forward surface 101 of the probe element 17 is arranged to slope forwardly and downwardly from the base portion 96 of the carrier. For securing the probe element 17 within the carrier 83, the base portion 96 of the carrier is provided with four bores arranged to receive four bolts 105 the inner ends of each bolt 105 extending within a complementary bore formed in the probe element 17.

Upon the forward surface 101 of the probe element 17 is mounted a piezo-electric crystal (not shown) to which pulses of alternating electric potential of ultrasonic frequency are applied during operation of the probe. The crystal generates corresponding pulses of sound waves of ultrasonic frequency which travel downwardly through the Perspex element 17 normally to the surface 101 thereof, through the interface between the probe element 17 and pipe section 7 and obliquely through the butt weld between the pipe section 7 and the adjacent pipe section.

In order to facilitate the testing, means can be provided for discharging fluid for serving as a couplant at the probe-pipe interface. Such means may take the form of nozzles connected with a liquid container from which the couplant may flow under the influence of pressure or an hydraulic head.

Alternatively a roller or rollers 5 can be adapted to supply liquid couplant to a part of the surface of the pipe section 7 in advance of the probe element 17. For example, a liquid container carried by the chain 3 can be arranged to eject liquid onto the roller or rollers 5, the roller or rollers serving to spread the liquid. In some instances liquid to be supplied may be contained within a roller or rollers 5 formed with holes for the passage of the liquid to the surface of the pipe section.

In order to test a butt weld between the pipe section 7 and the adjacent pipe section, the probe supporting means 1 are mounted upon the pipe adjacent the weld by placing the chain 3 around the pipe and drawing the ends of the chain together by securing the helical tension springs to the wire loops provided at the front and rear sides of the extremities of the chain 3. Supersonic waves generated by the piezo-electric crystal on the probe element 17 are then transmitted by the element obliquely through the layer of liquid couplant at the probe-pipe section interface and through the adjacent part of the butt weld. In the event of waves being reflected by a fault constituting a discontinuity, the reflections are received by the crystal and converted therein to provide an electrical oscillation which is utilized to give an indication on an oscilloscope. By rotating the probe supporting means on the circular track afforded by the pipe, sections of the weld falling within the ultrasonic beam transmitted through the probe element 17 can be successively examined. The process is repeated by moving the probe around a plurality of axially displaced orbits at each side of the weld, the location of any indicated fault is noted and the weld is further examined in the neighbourhood of the said location. The further examination can be carried out by manually positioned probes.

Typical electric circuitry for an ultrasonic probe is disclosed in U.S. Patent 2,700,895, issued February 1, 1955, to H. L. Carson.

Figure 6:
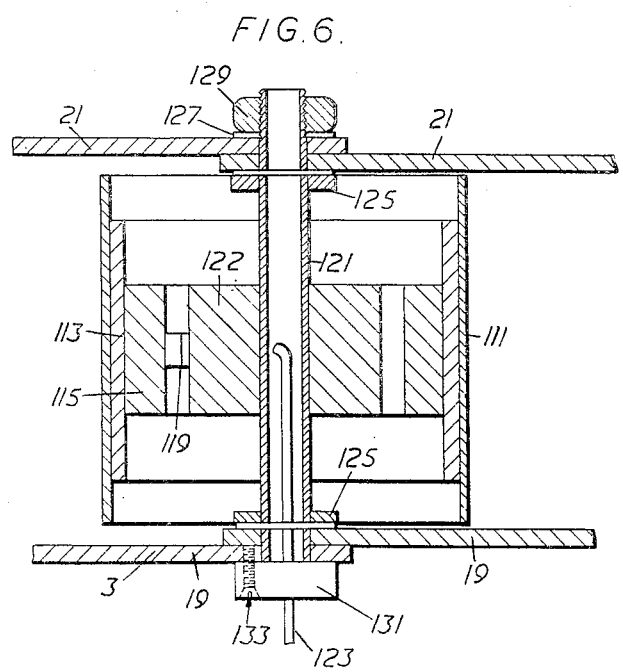
Figure 6 is a sectional plan view taken on the line VI—VI of Figure 5.

Figures 5 and 6 show a modification which when incorporated in the probe supporting means 1, can be utilized in conjunction with an oscilloscope having a long persistent screen to provide a pictorial representation showing the position of defects in a length of the weld equivalent to the circumference of one of the rollers 5. To this end, one of the rollers 5 of the probe supporting means 1 is replaced with a roller 111 having a diameter equal to that of the rollers 5 and lined with a non-conducting cylinder 113 within which is mounted a toroidal resistance coil 115, one end of the coil being connected by soldering to a conducting strip 117 which in turn is connected to the inner surface of the roller 111, which surface, since the roller is a component of the chain, is earthed. A spring contact 119 arranged to engage the resistance 115 is fixed by means of a screw 116 to a non-conducting cylinder 122 fitted rigidly upon a spindle 121, which is hollow and non-rotatable with respect to one of the associated chain links. A cable 123 leads from the spring contact 119 radially through the non-conducting cylinder 122 and the wall of the spindle 121 and axially through the spindle 121 to the exterior of the chain 3.

The roller 111 is provided with webs 125 similar to the webs 63 of the rollers 5 and with a washer 127 and a nut 129 securing one end of the spindle to the chain 3 whilst, secured to the other end of the spindle is a ring 131 fixed in relation to one of the front side pieces 19 of the chain 3 by means of a grub screw 133.

During operation, when the chain 3 as a whole advances, the roller 111 revolves around its spindle 121 and thus the contact 119 slides along the inner face of the toroidal resistance coil 115 so that the portion of the resistance included between the cable and earth is continuously varied in proportion to the advance of the probe. The varying potential difference developed between the contact 119 and the conducting strip 117 is applied to the Y-deflection plates of the cathode ray tube. By appropriate selection of the value of the toroidal resistor 115 it is possible to produce on a long persistent screen a pictorial representation of a length of the weld under test equal to the length of the circumference of the roller 111 or multiples of that circumferential length. Thus it is possible to choose a value for the toroidal resistor 115 which will produce on the oscilloscope a pictorial representation indicating the position of defects in the entire weld. To obtain such a representation it would be necessary at the completion of each revolution of the roller 111 to apply an additional biassing voltage to the Y-deflection plates of the cathode ray tube, equal to the maximum potential difference developed across the resistor 115.

From the above description it will be understood that the probe supporting means 1 may readily be adapted, by the addition or subtraction of a link or links, for use, within limits, with pipe sections of different diameters. The supporting means may easily and rapidly be placed in position in relation to a pipe section and since the radial dimensions of the supporting means are small this may generally be done without difficulty even if access to a pipe section is somewhat restricted. The testing is carried out relatively rapidly and with relatively little effort on the part of the operator. Automatically, the probe is pressed onto the surface of pipe section 7 with a constant pressure and the contact face of the probe is kept tangential to the pipe section. A series of tests on zones variously spaced from the centre of the weld by predetermined distances may be effected and, provided the probe is moved throughout the whole of its orbit the danger of missing a part of the weld is avoided.

Figure 7:
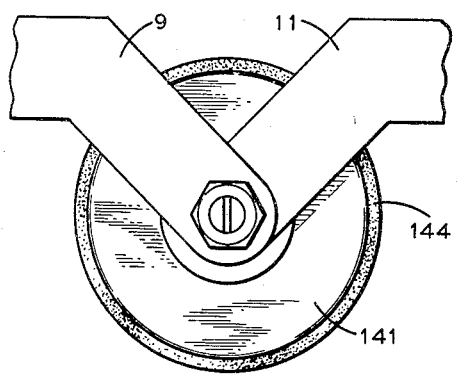
Figure 7 is a fragmentary partial elevation view illustrating a modified form of roller for supplying couplant fluid to the work.
Figure 8:
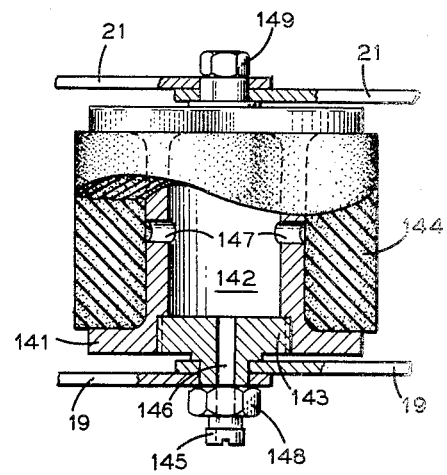
Figure 8 is a plan view, partly in section, of the roller of Fig. 7.

Figs. 7 and 8 show an example of the design of an apertured roller for the supply of liquid couplant. One of the ordinary rollers of the roller jig is replaced by the bobbin 141 whose cavity 142 is closed by the plug 143. A layer 144 of a suitably chosen foam plastic surrounds the bobbin 141. By removing the screw 145 the couplant can be poured into the cavity 142 through the bore 146 of the plug 143. The couplant will seep gradually through the two holes 147 into the foam plastic 144. The latter projects over the edge of the bobbin 144 so that it is slightly compressed when the roller jig as a whole is moved around the pipe under examination. The compression of the foam plastic will cause some of the couplant with which it is soaked to be released on to the surface of the test piece. The diameter of the holes 147 should be chosen suitably with regard to the desired rate of the supply of couplant. The volume of the cavity 142 is sufficient to take up the couplant which may be required for one examination. The roller jig has to be moved in such a direction that the couplant carrying bobbin precedes the link on which the probe is mounted. The nuts 148 and 149 retain the bobbin within the links, such as 10, 11, 12 and 13.

Figure 9:
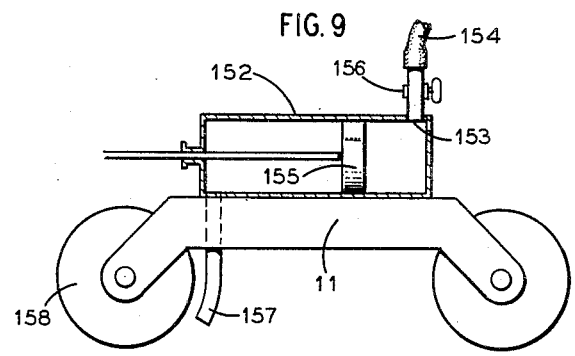
Figure 9 is a somewhat diagrammatic fragmentary elevation view illustrating a pressure head means for the supply of couplant fluid to the work.

Fig. 9 shows the diagram of a pressure head for the supply of couplant. The link 11 which precedes the probe carries a cylinder 152 whose inlet 153 is connected to an air pressure source by means of a rubber tube 154. The latter must be sufficiently long to allow at least one complete rotation of the probe around the test piece. A piston 155 moves through the cylinder when the cock 156 is opened. The outlet nozzle 157 is also used for filling the cylinder with couplant before the operation of the jig starts. When the cock 156 is opened suitably with regard to the desired rate of the couplant supply, couplant will be pressed out of the nozzle on to the surface of the test piece or the roller 158 respectively, depending on the instantaneous position of the jig. In any case, the roller 158 is used to spread the couplant evenly over the section of the pipe surface which is to come into contact with the probe.

Figure 10:
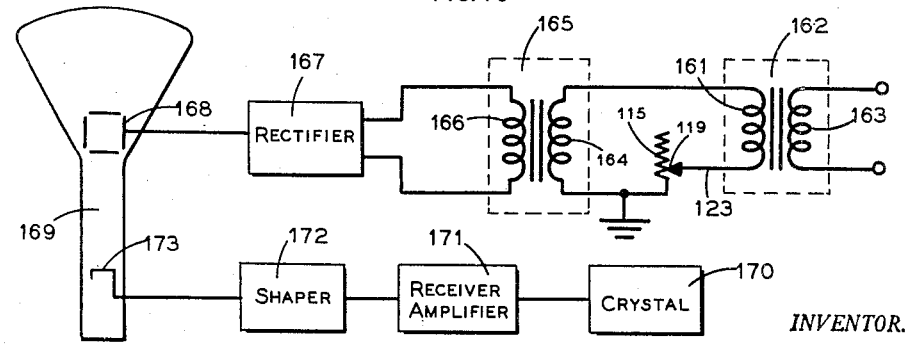
Figure 10 is a schematic block wiring diagram of the electrical circuitry.

The arrangement shown in Fig. 10 can be used in conjunction with a cathode ray tube having a long persistence screen to produce a pictorial representation showing the position of defects in a length of weld.

The lead 123 from the spring contact 119 of the toroidal resistance 115 is connected to one end of the secondary winding 161 of a transformer 162 whose primary winding 163 is suitably wired in the main flaw detector to provide a constant A.C. voltage across 163. The other end of winding 161 is connected to one end of the primary winding 164 of a transformer 165, the other end of winding 164 being grounded. One end 117 of the toroidal resistance 115 is grounded through the roller 111 as heretofore described. By suitably choosing resistance 115 and transformers 162 and 165, the constant A.C. voltage developed across winding 163 appears across winding 161 and divides between winding 164 and resistance 115 in proportions depending on the amount of resistance 115 in circuit through contact 119 and lead 123. During operation, contact 119 slides along resistance 115 as heretofore described and thus produces an A.C. voltage across winding 164 which varies with the advance of the probe. The voltage developed across the primary winding 164 of transformer 165 produces an A.C. voltage across the secondary winding 166. This is fed to a rectifier and coupling arrangement 167 to produce a D.C. voltage which in turn is fed to a Y plate 168 of the cathode ray tube 169.

In the form of pictorial representation desired, the receiving piezo-electric crystal 170 of the probe element 17 is connected to the main receiver amplifier 171 of the flaw detector. The output of the amplifier 171 is shaped by well known means in the shaper 172 such that echoes picked up by the receiving crystal give negative going pulses from shaper 172 which are applied to the cathode 173 of the cathode ray tube 169 in order to intensely modulate the electron beam of this tube. A time sweep, not visible on the tube screen in the absence of a pulse from shaper 172 is applied to the Y plates of the cathode ray tube.

In the invention arrangement, cathode modulation is utilized, rather than the more commonly used grid modulation, in order to provide an intense modulation of the electron beam of tube 169.

What I claim is:

1. Probe supporting means, for ultrasonic testing of butt welds formed between sections of a hollow cylindrical body such as a pipe, comprising, in combination, a chain with rollers for running on the body a weld of which is to be tested, means for connecting ends of the chain, with the chain embracing the body and the rollers urged towards engagement with the body, and an ultrasonic probe carrier fixed against movement circumferentially of the positioned chain and movable radially relatively to the chain and means biasing said probe carrier to urge a probe carried thereby towards contact with the outer surface of the body.

2. Probe supporting means as claimed in claim 1, wherein the rollers are arranged on spindles at the junctions of the links of the chain and on spindles at the extremities of the chain and the links are so shaped that respective central portions thereof, when the chain is assembled on a hollow cylindrical body, are radially outwardly offset relatively to lines joining the respective axes of the associated rollers.

3. Probe supporting means as claimed in claim 1, wherein the number of links of the chain may readily be varied.

4. Probe supporting means as claimed in claim 1, wherein resilient means are provided for drawing the ends of the chain towards one another.

5. Probe supporting means as claimed in claim 1 including supporting means suspending said carrier from a chain link and constructed and arranged to permit sufficient freeplay of said carrier relative to the link to provide for the carrier to rock slightly under the influence of said biasing means; said biasing means comprising springs engaged between the link and said carrier.

6. Probe supporting means as claimed in claim 1 including a liquid container; and nozzles operatively associated with said carrier and connected to said container for discharging liquid to serve as a couplant at the interface of the probe and the body.

7. Probe supporting means as claimed in claim 1 including a liquid container; one of the chain rollers being apertured for discharge of liquid therefrom; and means connecting said roller to said container to supply liquid couplant to a part of the surface of the body in advance of the probe.

8. Probe supporting means as claimed in claim 1 including a circumferentially discontinuous annular impedance coaxial with one of the rollers and rotatable therewith; a contact electrically connecting one end of said impedance to said roller; a non-rotatable spindle within, and electrically isolated from such roller; and a second contact fixed against rotation and carried by said non-rotatable spindle, said second contact being engaged with said impedance; whereby, during rotation of the roller, the length of the impedance included between said contacts will be varied in accordance with the distance traveled by said one roller.

9. Probe supporting means as claimed in claim 8, wherein the roller houses the impedance.

10. Probe supporting means as claimed in claim 8 including a cathode ray tube having a long persistence screen; and a conductor connected between said second contact and a pair of deflection plates of said tube to apply to said deflection plates a potential varying in accordance with rotation of said one roller to provide an indication of the position of a weld defect along the length of travel of said one roller.

References Cited in the file of this patent

UNITED STATES PATENTS 2,725,491     Haswell _____ Nov. 29, 1955

FOREIGN PATENTS 696,920     Great Britain _____ Sept. 9, 1953
1,078,409    France _____ May 12, 1954